United States Patent [19]

Albrecht et al.

[11] 4,295,708
[45] Oct. 20, 1981

[54] ELECTRO-MECHANICALLY ROTATABLE MIRROR

[75] Inventors: Robert D. Albrecht, Bethany; Michael Presley, Shawnee; William E. Waller, Ardmore; Gerald L. Cook; William E. Presley, both of Stroud, all of Okla.

[73] Assignee: Presley, Waller & Presley, Ardmore, Okla.

[21] Appl. No.: 98,754

[22] Filed: Nov. 30, 1979

[51] Int. Cl.³ .............................................. G02B 7/18
[52] U.S. Cl. .................................................. 350/289
[58] Field of Search ...................... 350/289; 74/501 M

[56] References Cited

U.S. PATENT DOCUMENTS

| | | | |
|---|---|---|---|
| 3,005,384 | 10/1961 | Baird et al. | 350/289 |
| 3,119,591 | 1/1964 | Malecki | 74/501 M |
| 3,132,201 | 5/1964 | Bertell et al. | 350/289 |
| 3,722,984 | 3/1973 | Brean | 350/289 |

FOREIGN PATENT DOCUMENTS 1505350 10/1969 Fed. Rep. of Germany ...... 350/289

*Primary Examiner*—Jon W. Henry
*Attorney, Agent, or Firm*—Robert M. Hessin

[57] ABSTRACT

Disclosed is an apparatus for providing generally lateral or rearward vision at a plurality of selectable angles. This apparatus is electro-mechanically rotatable and may be remotely actuated. The apparatus includes a support member used to support the apparatus and connect it to whatever it is to be used with. Also included is a rearview structure having a housing, a mirror, a mechanism for rotatably connecting the mirror to the housing, and another mechanism for symmetrically rotating the mirror through the various angles. The apparatus also includes a mechanism which can be remotely operated to actuate the rotating mechanism of the rearview structure.

10 Claims, 7 Drawing Figures

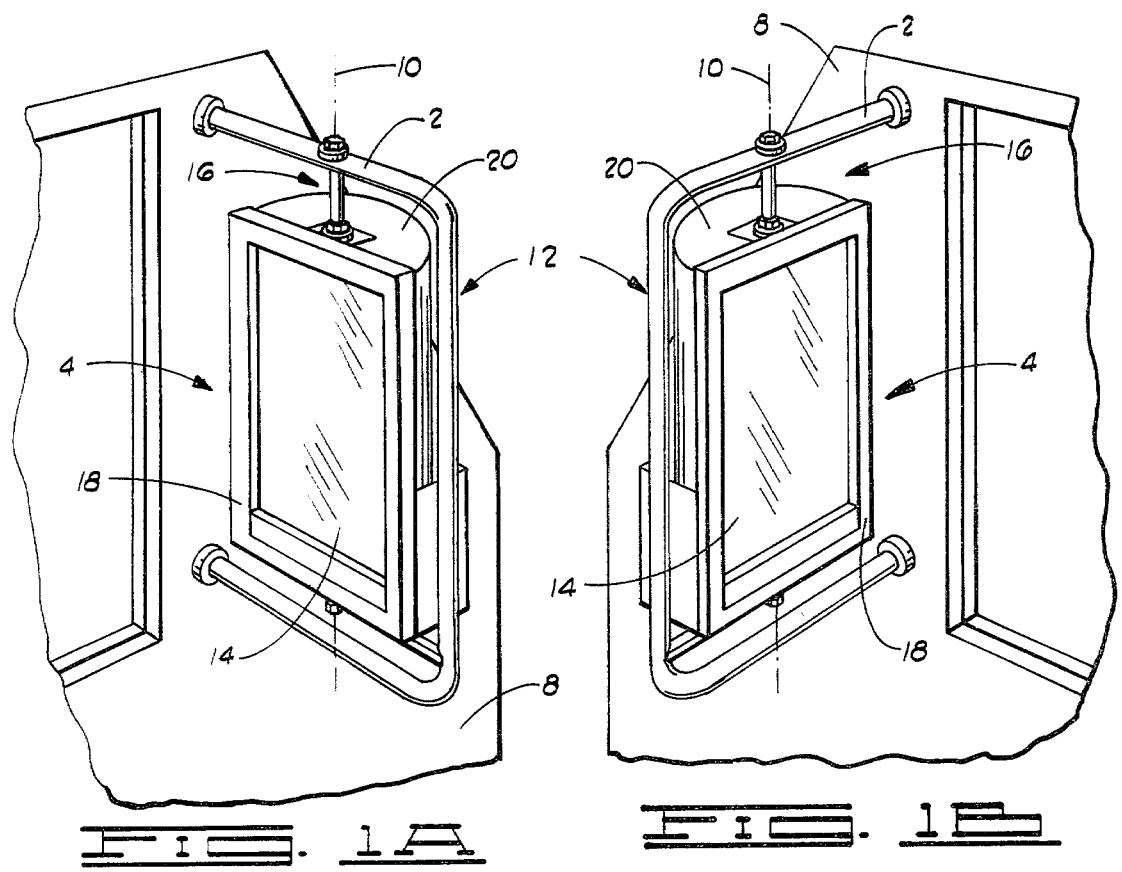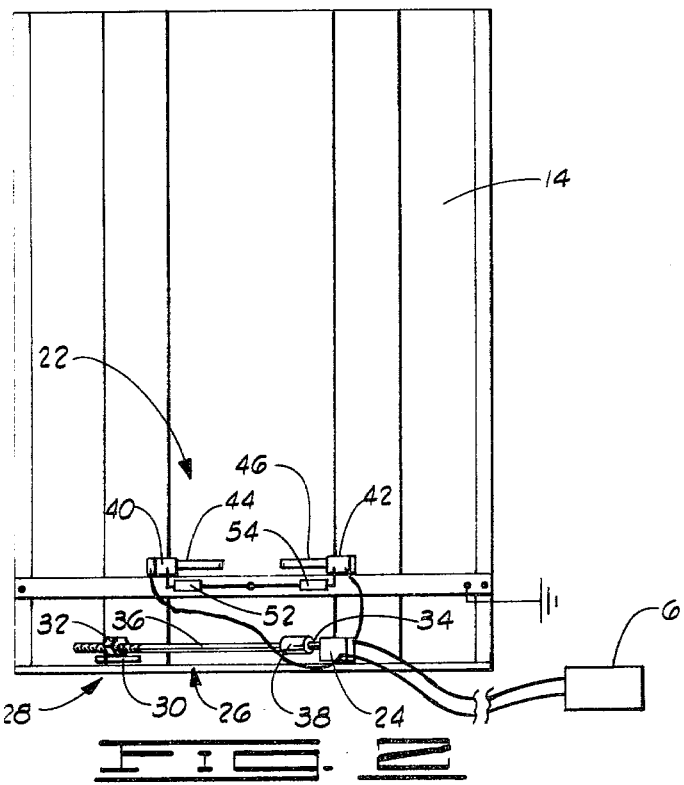

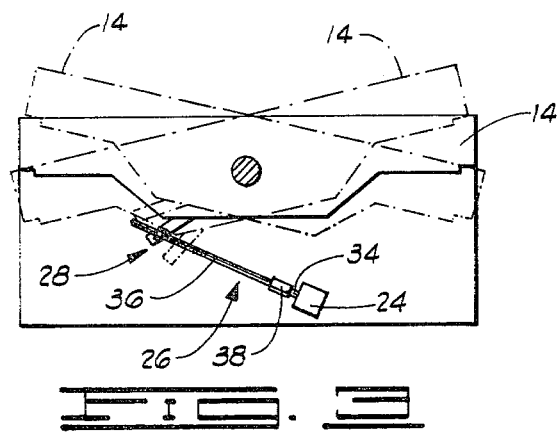
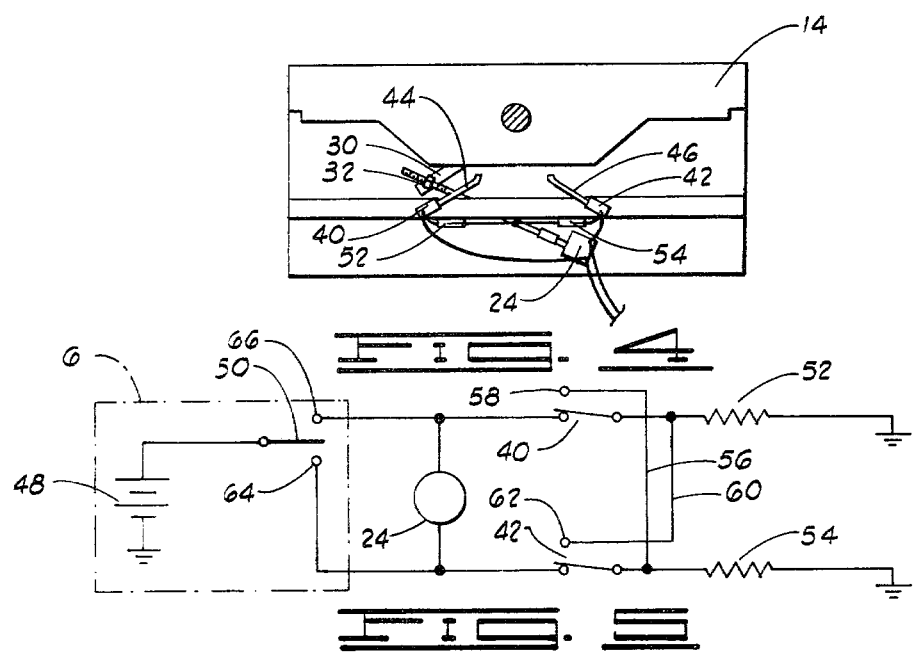
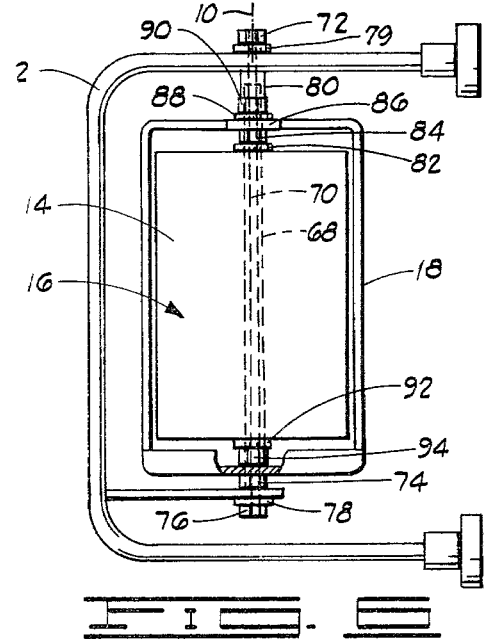

ELECTRO-MECHANICALLY ROTATABLE MIRROR

BACKGROUND OF THE INVENTION

1. Field of the Invention

This invention relates generally to apparatus for providing substantially lateral and/or rearward vision to a user of the apparatus and more particularly, but not by way of limitation, to mirror apparatus which can be used on either the driver's side or passenger's side of a vehicle and which can be remotely controlled to electro-mechanically rotate symmetrically about a neutral position.

2. Description of the Prior Art

During the operation of a vehicle, a driver must be continually aware of what is to the side of and behind him or her. In certain situations of everyday driving, the presently known types of locally manually adjustable side and rearview mirrors found on our vehicles are adequate to provide this lateral and rearward awareness. However, many times this type of mirror is inadequate. For example, when a driver of a tractor-trailer is trying to maneuver the trailer, a varying field of side and rear vision is required. To use the standard locally manually adjustable side or rearview mirror would be a time consuming and inefficient way to obtain adequate vision. Furthermore, such a manually adjustable mirror may create a dangerous situation for people in the vicinity of those drivers who neglect to make the necessary adjustments and merely drive blindly. Therefore, there is a need for a mirror which can be remotely electro-mechanically rotated to effect an expanded rearward field of vision.

This general need has been recognized as indicated by a number of patents known to me. For example, U.S. Pat. No. 4,076,392 issued to Suzuki et al. discloses a type of rotatable mirror including a drive motor, a plurality of gears, a fixed position screw shaft, and various other elements. Other types of rotatable mirrors are disclosed in U.S. Pat. No. 3,868,176 issued to Young, U.S. Pat. No. 3,596,079 issued to Clark et al. and U.S. Pat. No. 3,476,464 issued to Clark. Other patents known to me which disclose adjustable mirrors include:

| U.S. Pat. No. | Issued to |
| --- | --- |
| U.S. Pat. No. 4,116,538 | Oskam |
| U.S. Pat. No. 4,088,398 | Zoursel |
| U.S. Pat. No. 3,950,080 | McKee et al. |
| U.S. Pat. No. 3,741,633 | Haley |
| U.S. Pat. No. 3,527,528 | McKee et al. |
| U.S. Pat. No. 3,493,295 | Kobrehel |

Although these references suggest several proposals for meeting the general need of a rotatable rearview mirror, I believe there are several more specific needs not met by these references. For example, such a mirror should be lightweight, yet durable so that it can be easily manufactured. This light-weight feature permits the use of smaller, more simplified, and therefore more easily maintainable, elements. The durability feature creates the need for a covering to protect the mirror from adverse environmental conditions.

There is also the need for an electro-mechanically rotatable mirror to have a means which may be adjusted to control the tightness of the rotation of the mirror. Such a means is necessary to compensate for the differences of the individual components used in each mirror so that the correct degree of tightness can be initially established. Furthermore, as the mirror is subjected to the wear and tear of use, the degree of tightness may need to be adjusted. Therefore, if such an adjustable means were not provided, an entire new mirror assembly would have to be purchased when the old mirror became worn.

I believe that there is the need for an electro-mechanically rotatable mirror which may be mounted on either side of a vehicle without requiring substantial modifications. Such a versatile unit leads to manufacturing economies not possessed by less versatile units which may have been previously proposed. This versatility raises the need for a mirror which can be reversibly rotated.

Because I believe these needs have remained unsatisfied prior to the present invention, I also believe that no previously disclosed device known to me indicates either singly or in combination, the present invention.

SUMMARY OF THE INVENTION

The present invention overcomes the above-noted and other shortcomings of the prior art by providing a novel, useful and improved electro-mechanically rotatable mirror. This mirror is relatively lightweight, yet durable and can be remotely actuated. It is lightweight because its design permits the use of smaller, more simplified, elements. The mirror has an outer covering to also make it durable. Furthermore, this mirror has a means whereby the tightness of the rotation can be adjusted so that this mirror meets the needs of compensating for the differences between individual components and for their changes during use. Additionally, the present invention meets the versatility need by having a symmetrical construction so that it may be used on either side of a vehicle. This symmetrical construction includes reversible rotation of the mirror.

Structurally, the present invention is an apparatus which is connectible to a vehicle for providing generally lateral or rearward vision to the driver at a plurality of selectable angles on either side of a neutral position. This apparatus includes a support member used to support the apparatus and to connect it to the vehicle. Also included is a rearview structure having a housing, a mirror, a means for rotatably connecting the mirror to the housing, and means for symmetrically rotating the mirror through the various angles on either side of the neutral position. Finally, the apparatus also includes a means associated with the rearview structure which the driver operates to actuate the rotating means.

More particularly, the symmetrically rotating means includes a motor having a drive shaft extending therefrom which can be reversibly rotated. The rotating means also includes a means extending from the mirror for engaging the drive shaft in a fixed angular relationship. This fixed angular relationship is maintained during periods of interaction betwen the drive shaft and the drive shaft engaging means by separate means. The rotating means further includes first and second limiting means which limit the maximum degree of rotation of the mirror to a predetermined angle in either direction of rotation about the mirror's axis.

The means for rotatably connecting the mirror to the housing includes an annular rod extending through the mirror along its axis. Disposed substantially concentrically within this annular rod is a retaining rod for connecting the mirror to the support member. There is also a means for adjusting the tightness of the rotatable engagement existing between the annular rod and the mirror.

The means for controlling the rotation of the rearview structure may include a switch means coupling the motor and rotation limiting means to the vehicle's power supply.

From the foregoing, it is apparent that a general object of the present invention is to provide a novel, useful and improved electro-mechanically rotatable mirror. Other and further objects, features and advantages of the present invention will be readily apparent to those skilled in the art upon a reading of the description of the preferred embodiments which follows, when taken in conjunction with the accompanying drawings.

BRIEF DESCRIPTION OF THE DRAWINGS

FIG. 1A is a perspective view of a preferred embodiment of the present invention mounted on the right side of a vehicle.

FIG. 1B is a perspective view of the FIG. 1A device mounted on the left side of the vehicle.

FIG. 2 is a rear elevation schematic view of a preferred embodiment of the present invention without the FIGS. 1A-1B covering.

FIG. 3 is a top plan schematic view of the mirror and motor assembly of a preferred embodiment of the present invention.

FIG. 4 is a top plan schematic view of the mirror, motor and rotation limiting means assembly of a preferred embodiment of the present invention.

FIG. 5 is a schematic circuit diagram of the electrical connections in a preferred embodiment of the present invention.

FIG. 6 is a rear elevation view detailing the rotatable connection means of a preferred embodiment of the present invention.

DETAILED DESCRIPTION OF PREFERRED EMBODIMENTS OF THE INVENTION

With reference now to the drawings and in particular initially to FIGS. 1A and 1B, the present invention will be more fully described. The preferred embodiment shown in FIGS. 1A-1B includes a support member 2, a rearview structure 4 and a means 6, shown in FIG. 2, for actuating the electro-mechanical rotation of the present invention. FIGS. 1A-1B further show the present invention connected to a vehicle 8. FIG. 1A shows the apparatus connected to the right side of the vehicle 8, and FIG. 1B shows the same apparatus connected to the left side of the vehicle 8. With the preferred embodiment shown in FIGS. 1A-1B this mounting versatility is achieved by having the rearview structure 4 pivotably mounted along an axis 10 so that the structure may be pivoted thereabout through at least 180° with respect to the support member 2. In other words, in switching the device from the right side as shown in FIG. 1A, the rearview structure 4 is pivoted approximately 180° so that the two legs of the support member 2 extend to the right, instead of to the left, of the rearview structure 4 for connection to the left side of the vehicle 8 as shown in FIG. 1B.

The pivotable rearview structure 4 includes a housing 12 having a mirror 14 contained therein. The mirror 14 is associated with the housing 12 by a means for rotatably connecting the mirror to the housing along the axis 10. This means is generally indicated by the reference numeral 16. In addition to containing the mirror 14, the housing 12 contains a means for symmetrically rotating the mirror 14 about the axis 10 through a plurality of selectable angles on either side of a neutral position. For the preferred embodiment shown in FIGS. 1A-1B this neutral position is that in which the reflective surface of the mirror 14 is substantially parallel to the front of the housing 12. This front of the housing 12 is defined by a frame 18. The frame 18 joins with a hood 20 to constitute the housing 12 of this preferred embodiment.

With reference now to FIGS. 2-5 a preferred embodiment of the means for symmetrically rotating the mirror 14, indicated generally in FIG. 2 by the reference numeral 22, will be described. FIG. 2 shows that the means 22 includes a motor 24 having a drive shaft 26 extending therefrom. FIG. 3 indicates the drive shaft 26 is disposed in acute angular relationship to the mirror 14. The drive shaft 26 is shown in FIG. 2 to be threadedly coupled to a means 28 extending from the mirror 14. The means 28 engages the drive shaft in a fixed angular relationship. So that this angular relationship is maintained during periods of interaction between the motor 24, the drive shaft 26, and the engaging means 28 whereby mirror rotation is obtained, the rotating means 22 further includes a means for maintaining this fixed angular relationship. FIG. 2 further discloses that the rotating means 22 includes first and second means electrically connected to the motor 24 for limiting the mximum degree of rotation of the mirror 14 effected by the motor 24.

The motor 24 may be any suitable type of motor. The type of motor used in the preferred embodiment of the present invention is a 6-volt d.c. motor. However, the motor 24 could be another type of device such as a 12-volt motor or any other suitable means. FIG. 2 shows that the motor 24 is electrically connected to the actuating means 6. This actuating means 6 is preferably a singlepole, double-throw toggle switch which couples the power inputs of the motor 24 to the vehicle power source when the toggle switch is in either one of its thrown positions. The switch of the actuating means 6 may be remotely located from the mirror assembly. For example, it could be located near the vehicle driver's position.

The drive shaft 26 which extends from the motor 24 may be either a single-piece structure or a two-piece structure as subsequently described with reference to the means for maintaining the fixed angular relationship between the drive shaft 26 and the engaging means 28. Regardless of how many segments the drive shaft 26 has, the end of the shaft opposite the motor 24 contains screw threads in the preferred embodiment.

The screw threads permit the drive shaft 26 to be movably coupled with the engaging means 28. In the preferred embodiment shown in FIG. 2 and more clearly in FIGS. 3-4, the engaging means 28 is shown to include a traveling block having an arm member 30 extending from the mirror 14. Mounted on the arm 30 is a thread engaging member such as a nut 32. In the preferred embodiment the arm 30 is rigidly secured to the mirror 14 and the nut 32 is connected to the arm 30 so that the nut 32 engages the screw-threaded end of the drive shaft in a fixed angular relationship.

To maintain this fixed angular relationship between the nut 32 and the drive shaft 26 during periods of rotation, as illustrated by the rotated positions of the mirror 14 shown by the phantom line drawings in FIG. 3, a means for maintaining this relationship must be used. This means may include a pin extending from the motor 24 and a slot defined in the housing 12. The pin is retained within the slot so that the slot slidably engages the pin and motor during periods of mirror rotation. By having the slot properly formed within the housing 12, the motor 24 can properly pivot as the mirror 14 rotates so that the fixed angular relationship is maintained. Although these elements constitute one type of maintaining means, the preferred embodiment maintaining means disclosed in FIGS. 2-4 includes a first drive shaft segment 34 secured to the rotor of the motor 24 and a second drive shaft segment 36 having a screw-threaded end. The end of the segment 34 extending from the motor 24 is a free end which is coupled to the non-threaded end of the segment 36 by a flexible sleeve element 38. The sleeve 38 pivotably couples the first segment 34 to the second segment 36 so that the second segment 36 pivots with respect to the first segment 34 to maintain, during periods of mirror rotation, the fixed angular relationship existing between the second segment 36 and the nut 32.

By utilizing the motor 24, the drive shaft 26, and the engaging means 28 in this manner, the mirror 14 can be controlled via the actuation means 6 to rotate the mirror 14 in either direction about its axis. Various positions of such rotation are illustrated by the phantom line drawings shown in FIG. 3. So that the present invention may be identically used on any side of a vehicle it is necessary to limit the maximum degree of this rotation to the same predetermined angle in both directions of rotation. In other words, the degree of rotation in either direction about the mirror axis must be symmetrical with respect to the reference, or neutral, position of the mirror 14. This neutral position is illustrated in FIG. 3 by the solid line drawing of the mirror 14.

This symmetrical limiting is accomplished by the first and second limiting means which, in the preferred embodiment shown in FIGS. 2 and 4, include a first switch means 40 and a second switch means 42. Switch means 40 has a first cantilever member 44 extending therefrom so that it comes in contact with the rear of the mirror 14 when the mirror 14 has been rotated through the maximum predetermined angle in one of the two directions in which the mirror 14 can be rotated. The second switch means 42 has a second cantilever member 46 extending therefrom so that it comes in contact with the back of the mirror 14 when the mirror has been rotated through an equal maximum predetermined angle in the other of the two directions in which the mirror 14 can be rotated. This is most clearly shown in FIG. 4 by visualizing that when the mirror 14 is rotated by the motor 24 in a counterclockwise direction, the protruding rear portion of the mirror 14 will contact and depress the cantilever member 44 after rotation through the predetermined angle. Likewise, it can also be visualized that when the motor 24 rotates the mirror 14 in a clockwise direction, the protruding rear portion of the mirror 14 will contact and depress the cantilever member 46 of the second switch means 42 after traversing the predetermined angle from the reference, or neutral, position. Again, the neutral position is that position in which the mirror 14 is drawn in FIG. 4. Upon contact and depression of either of the cantilever members 44 or 46, the respective switch is opened to stop the operation of the motor 24 thereby to limit the maximum degree of rotation of the mirror 14 from its neutral position.

A preferred embodiment circuit for effecting the appropriate interconnections between the actuation means 6, the motor 24 and the limiting switch means 40 and 42 whereby the rotation is limited is schematically depicted in FIG. 5 of the drawings. This schematic indicates that the actuation means 6 includes the vehicle power supply, such as a battery 48. The means 6 is also shown to include a switch means 50 such as the previously mentioned single-pole, double-throw toggle switch. The switch 50 switchably connects the battery 48 to the motor 24 and the switches 40 and 42. Switches 40 and 42 are shown to be single-pole, double-throw switches. The FIG. 5 schematic further shows that the circuit includes a first resistor 52 extending from the pole of the switch 42 to the system ground. There is also a second resistor 54 which extends from the pole of the switch 42 to the system ground. Furthermore, there is an electrical connection 56 between switch contact 58 of the switch 40 and the pole of the switch 42. Similarly, there is a connection 60 extending between switch contact 62 of the switch 42 and the pole of switch 40. This schematic circuit is physically represented in FIGS. 2 and 4 except for the connections 56 and 60.

First assuming that the connections 56 and 60 are absent from the circuit, the basic operation of the FIG. 5 schematic will be described. With the switches 40, 42 and 50 in the positions as shown in FIG. 5, the mirror is stationary and not in contact with either of the cantilever members 44 or 46. The mirror 14 is stationary because the switch 50 has not been toggled to supply power to either one of the sides of the motor 24, and it is not contacting either of the members 44 or 46 because the switches 40 and 42 are shown in their closed positions. However, once switch 50 is toggled to connect the battery 48 to terminal 64, the motor rotates so that the screw-threaded drive shaft 26 draws the nut 32 towards the motor 24 thereby rotating the mirror in a counterclockwise direction until the rear of the mirror 14 contacts and depresses the cantilever member 44 (or until the switch 50 is released prior to such mirror-cantilever member contact). When this contact occurs, the switch 40 opens, thus breaking the electrical circuit and stopping the operation of the motor 24. The degree of counterclockwise rotation has thereby been limited.

Similarly, when the switch 50 is toggled to provide battery power to terminal 66, the motor 24 rotates in the opposite direction to drive the nut 32 away from the motor 24 thereby rotating the mirror 14 in a clockwise direction. As long as power is supplied to terminal 66, this rotation will continue until the rear of the mirror 14 contacts the cantilever member 46 to open the switch means 42. When this switch opens, the motor 24 rotation ceases because, again, the circuit has been broken. Thus the degree of rotation in the clockwise direction has also been limited to the predetermined angle established by the contact between the rear of the mirror 14 and the cantilever member 46.

The above is the basic manner of electro-mechanically rotating the mirror of the present invention. The resistors 52 and 54 shown in the figures are included to limit the current drawn from the normally 12-volt vehicular power supply 48 through the preferably 6-volt motor 24. The resistors may not be necessary in other, equivalent circuits for accomplishing the limited rotation. Furthermore, although the connections 56 and 60 have not been described as being necessary to the basic operation of the present invention, they have been included in the preferred embodiment because they place the resistors 52 and 54 in parallel during the periods when either one of the switches 40 or 42 is open. This paralleling provides a larger current to be initially applied to the motor 24 when it is to be moved away from one of its maximally limited degrees of rotation. For example, when the mirror is depressing the member 44 so that the switch 40 is open, resistors 52 and 54 are parallelled through contact 58 so that the effective resistance is reduced. This permits a greater current flow through the motor 24 when the switch 50 is toggled against the terminal 66 to rotate the mirror 14 in clockwise direction. This feature overcomes any binding the motor 24 might otherwise encounter in moving away from one of its maximally limited positions.

In order that the previously described rotating means 22 may effectively rotate the mirror 14, the mirror must be properly connected to its supporting structure so that it has the proper degree of freedom of rotation. This is accomplished with the rotatably connecting means 16. FIG. 6 shows that the means 16 generally includes an annular rod or tube 68 extending through a bore in the mirror 14 along the axis 10. The means also includes a retaining rod 70 disposed substantially concentrically within the tube 68. The rod 70 extends beyond the ends of the tube 68 for detachable engagement with the support member tube, as by nuts 72, 74 and 76, washers 78 and 79, and spacer element 80. The connecting means 16 further includes a means for adjusting the tightness of the rotatable engagement between the tube 68 and the mirror 14.

FIG. 6 shows that this tightness adjusting means includes a first washer 82 disposed adjacent the mirror 14 and concentrically around the tube 68. Also included is a first nut 84 disposed adjacent the first washer 82 and threadedly engaged with the tube 68. Next included is a housing engaging plate 86 having a bore defined therethrough through which the tube 68 and rod 70 extend. The plate 86 is disposed adjacent the first nut 84 opposite the first washer 82. The plate 86 is attached at its front to the frame 18 so that the mirror 14 is secured at this upper portion of the housing. Further included in the tightness adjusting means is a second washer 88 which is disposed adjacent the plate 86 and concentrically around the tube 68. Concluding the preferred embodiment adjusting means is a second nut 90 disposed adjacent the second washer 88 and threadedly engaged with the tube 68.

In operation the tube 68 and the retaining rod 70 are non-rotatably held by the respective nuts and washers previously mentioned. Because both of these rods are non-rotatably held, the rotation occurs between the movable mirror 14 and the stationary tube 68. To adjust the degree of tightness of the rotatable engagement between the mirror 14 and the tube 68, the adjusting means comprising the assemblage of the washer 82, the nut 84, the plate 86, the washer 88 and the nut 90 are adjusted up or down the threaded end of the tube 68 about which they are disposed. Thus as the nuts 84 and 90 are moved down the tube toward the mirror 14, the mirror is more tightly held so that the freedom of rotation is relatively limited, whereas when the nuts 84 and 90 are adjusted up the tube 68 away from the mirror 14, the freedom of rotation is relatively greater. In setting the tightness of mirror rotation, the nuts 84 and 90 are tightened against the plate 86 and the washer 88, respectively, to keep the nuts 84 and 90 from easily working loose when the mirror 14 is rotated. In this way rotation is controlled by the frictional engagement between the washer 82 and the upper surface of the mirror 14 as well as by the frictional engagement between the bottom of the mirror 14 and a washer 92 disposed adjacent thereto and held in place by a nut 94. It is to be noted that the washer 88 is not necessary for the adjusting means to properly function and thus may be deleted from other embodiments of the present invention.

Although the preceding discussion has generally dealt with a relatively large type of side-mountable rearview mirror for use with vehicles, it is to be noted that the present invention may be applied to non-vehicular uses and may be used without a large support member, such as the support member 2 disclosed in the drawings. For example, an alternative embodiment of the present invention may include a mirror which is held by a housing having a framework disposed to the rear of the mirror. This framework supports the motor and extends over the top and below the bottom of the mirror so that the means for rotatably connecting the mirror to the housing may be secured. Overlying this framework and extending to the edges of the mirror may be a protective covering. Thus, this type of mirror could be directly connectible to any part of a vehicle, or other device with which the present invention might be used, without having to pivot the rearview structure about the support member. In this type of device the symmetrical rotation about the reference, or neutral, position is sufficient to accomodate the multiple mounting position versatility of the present invention.

It is to be noted that the positioning of the motor and the limiting switches near the bottom of the mirror, as shown in the drawings, is not critical. That is, they may be mounted in any suitable position on the mirror, such as near the middle as in the alternative embodiment having a rear framework.

By utilizing the present invention, large lateral and rearward fields of vision may be obtained by a vehicle driver without having the driver periodically stop to make local manual mirror adjustments. For example, by mounting the support member 2 and rearview structure 4 on the right side of the cab of a tractor-trailer combination and placing the switch of the actuation means 6 within reach of the driver's seat, the driver can manipulate the switch to achieve any of the plurality of angles between the two limited extreme angles without having to stop vehicular movement. This is useful during such situations as backing maneuvers where a large field of vision is necessary as the trailer pivots about the tractor.

The foregoing thus discloses that the present invention of an electro-mechanically rotatable mirror is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. An apparatus connectible to a vehicle for providing rearward vision to a driver of the vehicle at a plurality of selectable angles on either side of a neutral position, said apparatus comprising:
    a support member connectible to said vehicle;
    a rearview structure connected to said support member, said rearview structure including:
        a housing;
        a mirror;
        means for rotatably connecting said mirror to said housing;
        a motor having a drive shaft extending therefrom in acute angular relationship to said mirror;

means extending from said mirror for engaging said drive shaft in a fixed angular relationship;

means for maintaining said fixed angular relationship during periods of interaction between said motor drive shaft and said drive shaft engaging means;

means associated with said rearview structure operable by said driver for actuating said rotating means wherein said drive shaft includes a first segment secured to the rotor of said motor, a second segment having one end portion threadedly connected to said drive shaft engaging means in said fixed angular relationship, and said fixed angular relationship maintaining means includes a flexible sleeve element for pivotably coupling said first segment to said second segment so that said second segment pivots with respect to said first segment to maintain said fixed angular relationship during said interaction.

2. An apparatus as recited in claim 1, wherein said rearview structure is connected to said support member along an axis so that said structure is pivotable about said axis through at least 180 degrees with respect to said support member.

3. An apparatus as recited in claim 1, wherein said symmetrically rotating means further includes:

first means electrically connected to said motor for limiting to a predetermined angle from said neutral position the maximum degree of rotation of said mirror by said motor in one direction; and second means electrically connected to said motor for limiting to said predetermined angle from said neutral position the maximum degree of rotation of said mirror by said motor in the direction opposite that direction limited by said first switch means.

4. An apparatus as recited in claim 3, wherein:

said first limiting means includes a first switch means having a first cantilever member extending therefrom so that said first cantilever member contacts said mirror when said mirror has been rotated through said predetermined angle in said one direction; and said second limiting means includes a second switch means having a second cantilever member extending therefrom so that said second cantilever member contacts said mirror when said mirror has been rotated through said predetermined angle in said opposite direction.

5. An apparatus as recited in claim 3, wherein said means for rotatably connecting said mirror includes:

an annular rod extending through said mirror for rotatable engagement therewith;

a retaining rod disposed substantially concentrically within said annular rod and detachably connected to said support member; and means for adjusting the tightness of said rotatable engagement between said annular rod and said mirror.

6. An apparatus as recited in claim 5, wherein said tightness adjusting means includes:

a first washer disposed adjacent said mirror and concentrically around said annular rod;

a first nut disposed adjacent said first washer and threadedly engaged with said annular rod;

a housing engaging plate having a bore defined therethrough through which said annular rod and retaining rod extend, said plate disposed adjacent said first nut; and a second nut disposed adjacent said plate and threadedly engaged with said annular rod.

7. A rearview mirror system, comprising:

a support member;

a rearview structure including:

a housing connected to said support member;

a mirror;

means for rotatably connecting said mirror to said housing;

a motor disposed within said housing, said motor having a first drive shaft segment and a second drive shaft segment;

a flexible annular sleeve pivotably coupling a first end of said second drive shaft segment to said first drive shaft segment;

a traveling block rigidly connected to said mirror and threadedly coupled with a second, screw end of said second drive shaft segment; and means associated with said rearview structure for acuating said motor to rotate said drive shaft segments and said annular sleeve so that said screw end of said second drive shaft segment engages said traveling block to rotate said mirror.

8. An apparatus as recited in claim 7, wherein said rearview structure further includes:

first means electrically connected to said motor for limiting the maximum degree of rotation of said mirror by said motor in one direction; and second means electrically connected to said motor for limiting the maximum degree of rotation of said mirror by said motor in the direction opposite that direction limited by said first switch means.

9. An apparatus as recited in claim 8, wherein:

said first limiting means includes a first switch means having a first cantilever member extending therefrom so that said first cantilever member contacts said mirror when said mirror has been rotated the maximum degree in said one direction; and said second limiting means includes a second switch means having a second cantilever member extending therefrom so that said second cantilever member contacts said mirror when said mirror has been rotated the maximum degree in said opposite direction.

10. An apparatus as recited in claim 9, wherein said means for rotatably connecting said mirror to said housing includes:

an annular rod extending through said mirror along said axis for rotatable engagement therewith;

a retaining rod disposed substantially concentrically within said annular rod and detachably connected to said support member; and means for adjusting the tightness of said rotatable engagement between said annular rod and said mirror.

* * * * *